Nov. 4, 1952　　　　　P. E. BESSIERE　　　　　2,617,052
ELECTRIC BRAKE
Filed Oct. 17, 1950　　　　　　　　　　　　　3 Sheets-Sheet 1
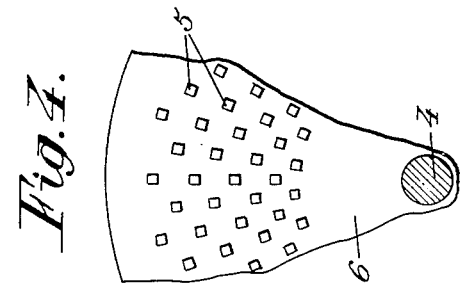
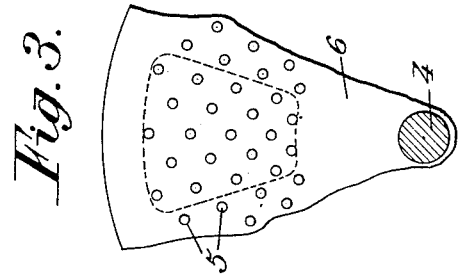
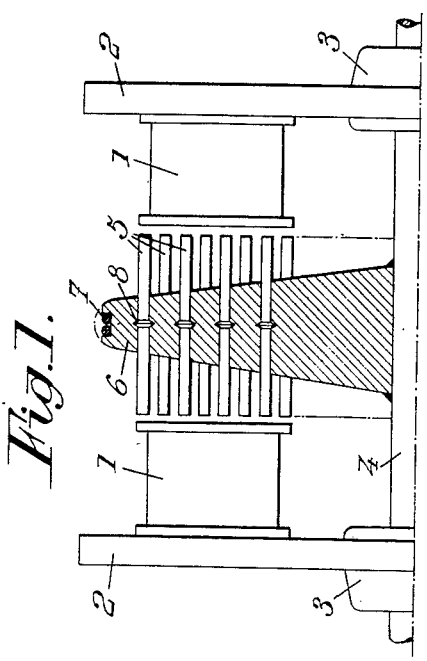
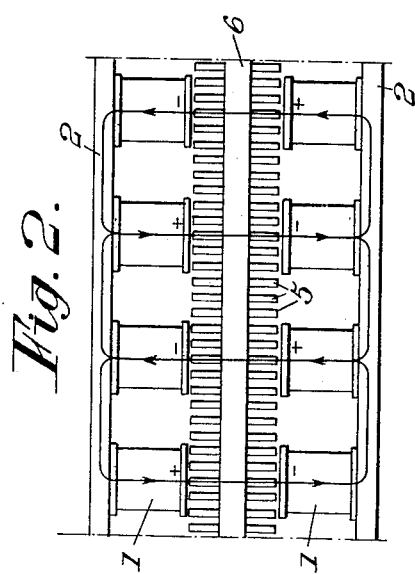
INVENTOR
PIERRE ETIENNE BESSIERE
BY
ATTORNEYS Nov. 4, 1952 P. E. BESSIERE 2,617,052
ELECTRIC BRAKE
Filed Oct. 17, 1950 3 Sheets-Sheet 2
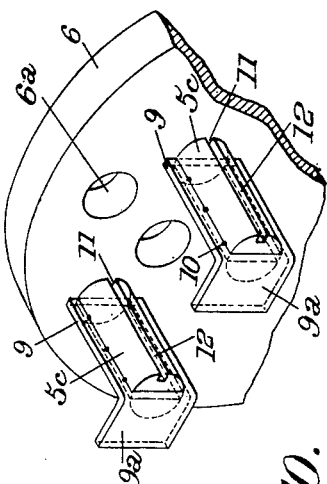
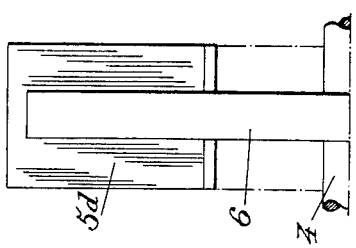
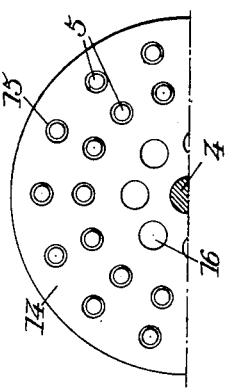
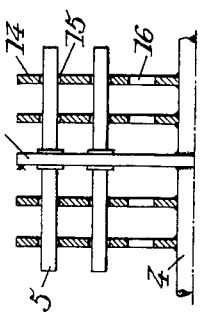
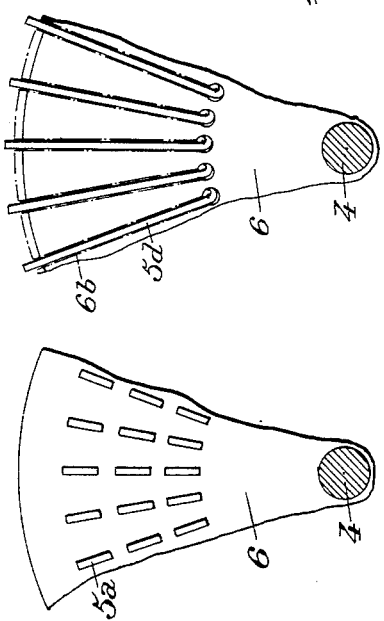
INVENTOR
PIERRE ETIENNE BESSIERE
BY
Bailey, Stephens & Huettig
ATTORNEYS Nov. 4, 1952
P. E. BESSIERE
2,617,052
ELECTRIC BRAKE
Filed Oct. 17, 1950
3 Sheets-Sheet 3
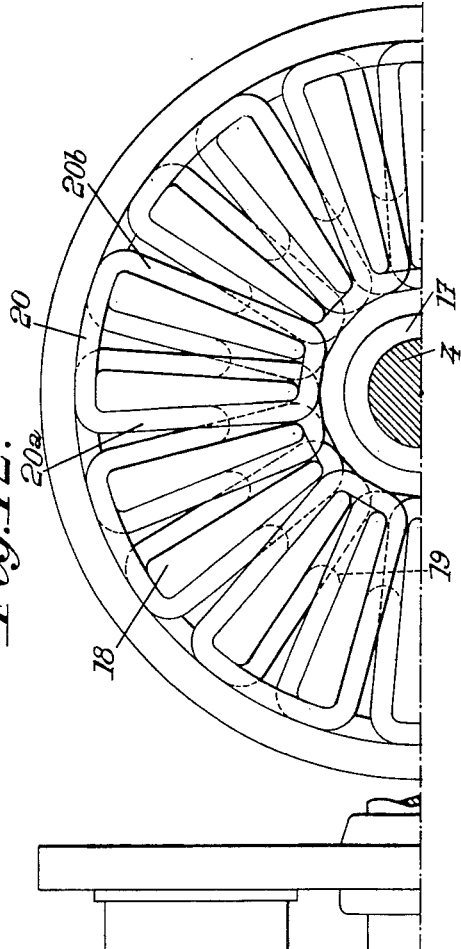
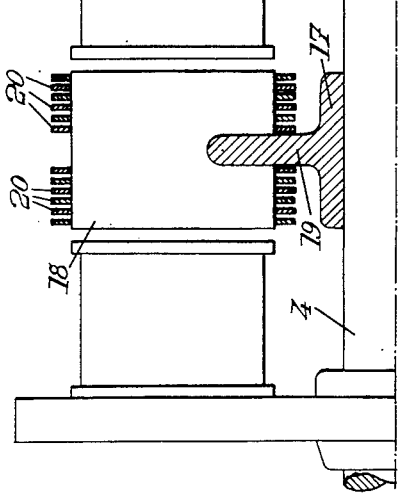
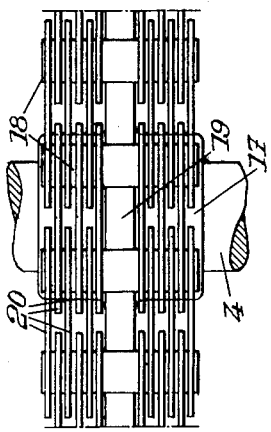
INVENTOR
PIERRE ETIENNE BESSIERE
BY
*Bailey, Stephens & Huettig*
ATTORNEYS Patented Nov. 4, 1952

2,617,052

UNITED STATES PATENT OFFICE 2,617,052

ELECTRIC BRAKE

Pierre Etienne Bessiere, Paris, France, assignor to Society "Electro-Mecanique de l'Aveyron," Rodez, France, a society of France Application October 17, 1950, Serial No. 190,611
In France October 22, 1949

11 Claims. (Cl. 310—93)

The present invention relates to electric brakes, that is to say to apparatus for braking a movement by transforming into heat, through Foucault currents or the like, the energy of movement to be absorbed.

Its object is to provide a brake of this kind which is better adapted to meet the requirements of practice than those used up to the present time.

According to my invention, in a brake of the type in question, including an inductor and an armature movable with respect to each other, with inductor pole pieces forming two groups disposed on either side of the armature respectively, this armature includes, on the one hand, at least one part for the formation of Foucault or analogous currents therein, and on the other hand, a plurality of magnetic flux conducting elements passing through said part and extending between the two groups of pole pieces of the inductor, the metal of this part being a better conductor of electricity than that of these elements but the metal of said elements being a better conductor of magnetic flux than that of said part.

According to a second feature of my invention, the magnetic flux conducting elements consist of elongated pieces, such as bars, rods or plates, extending in a direction substantially parallel to the axis of the armature and supported and fixed in holes of the above mentioned part, which is constituted by a disc or discs of a metal which is a good conductor of electricity but is not magnetic or is feebly magnetic, the cross sections of said bars, rods or plates where they extend through said disc or discs being sufficiently small so that, at the maximum working temperatures of the brake, differences of expansion remain sufficiently low not to cause perturbing deformations.

According to a third feature, the magnetic flux conducting elements are in the form of plates of substantially rectangular section and secured through only one of their edges in oblong slots or apertures, extending in a substantially radial direction, provided in the disc or discs which constitutes the above mentioned part, the whole being arranged in such manner that relative sliding between the magnetic flux conductors and the disc or discs can take place in a substantially radial direction, whereby independence of the expansions of the magnetic metal elements and of the disc or discs is achieved.

According to a fourth feature, the magnetic flux conducting elements are mounted on a part which is made of the same metal as said elements and resets on the same support, preferably constituted by the brake shaft, as the disc or discs through which extend the magnetic flux conducting elements, sufficient play being provided between said elements and said part to achieve independence of the expansions of the magnetic metal elements and of the disc or discs.

A fifth feature of my invention consists in disposing about the axis of the armature a plurality of closed rings made of a metal which is a good conductor of electricity but is not magnetic or is feebly magnetic, each ring surrounding one or several magnetic conducting elements and being supported thereby.

A sixth feature consists in arranging the brake armature in such manner that, under the effect of heating thereof, slots provided in the armature open so as to increase the internal resistance of the armature to Foucault currents.

Preferred embodiments of my invention will be hereinafter described with reference to the accompanying drawings, given merely by way of example and in which:

Fig. 1 diagrammatically shows one-half of a brake made according to my invention;

Fig. 2 is a developed view of the inductor and of the armature, showing also the path of the magnetic flux, in a brake made as shown by Fig. 1;

Figs. 3 to 7 are part view showing various embodiments of the armature (rotor) of a brake of the kind shown by Fig. 1;

Fig. 3a is a detail view corresponding to Fig. 3;

Fig. 8 is a part side view of the armature (rotor) shown by Fig. 7;

Figs. 9 and 10 show, in section and in elevation respectively, one-half of a rotor made according to another embodiment of my invention;

Fig. 11 is a cross section of a brake made according to still another embodiment of my invention;

Figs. 12 and 13 show, respectively in axial section and in plan view, the armature (rotor) of the brake of Fig. 11.

The brake includes, as usual, an inductor having pole pieces and an armature in which Foucault or analogous currents are formed, due to relative movement between the inductor and the armature. As a rule, the armature is coupled with the part to be braked, so as to revolve with respect to the inductor, which has no rotary movement. This rotary armature is called, in the following description, the brake rotor. The inductor includes two groups of pole pieces 1 fixed in a frame 2, preferably of a magnetic metal, which also constitutes a support for the bearings 3 of a shaft 4 on which is mounted the armature 5, which is located between the pole pieces 1 of the inductor.

When the pole pieces of the inductor are energized by an electric current, the magnetic flux thus obtained creates in the rotor Foucault or analogous currents which exert on the rotor both a braking and a heating action.

Up to now, the rotor was generally constituted by a disc or a magnetic material, in particular iron or soft steel, and the pole pieces, located opposite the side faces of the rotor on either side thereof, were given polarities alternating as diagrammatically shown by Fig. 2, so that two adjacent pole pieces on the same side of the rotor were of opposed polarities and two pole pieces located opposite each other on either side of the rotor also were of opposed polarities.

With such an arrangement, a great portion of the magnetic flux, instead of passing through the rotor in a direction substantially parallel to the axis thereof, i. e. instead of going from one pole piece located on one side of the rotor to the opposite pole piece located on the other side of the rotor, passed through the external side layers of the rotor, from one pole piece toward the adjacent pole pieces on the same side of the rotor. Furthermore, in the rotors of brakes of this kind, the same magnetic metal, i. e. iron or soft steel, acted both as conductor for the magnetic flux and as conductor for the Foucault currents. The intensity of these last mentioned currents, and consequently the braking torque for a given energizing, were reduced due to the poor conductivity of iron.

All these drawbacks are avoided with my invention, the essential feature of which consists in providing the rotor (armature) with a plurality of magnetic flux conducting elements 5, made of a magnetic metal such as iron, soft steel, nickel, etc., extending in a direction substantially parallel to the axis of revolution of the rotor, between the poles of opposed polarities located on either side of the rotor, these elements 5, which at least in the vicinity of the pole pieces are distant from one another being preferably of a length such that the air gap between their ends and the pole pieces is minimum.

Furthermore, said rotor includes at least one part, for instance a disc 6, of a metal which is a better conductor of electricity but a poorer conductor of magnetic flux, for instance copper, bronze, etc., through which the magnetic flux conducting elements extend, whereby most of the Foucault or analogous currents are formed in this part, due to alternation of the magnetic flux which passes through the magnetic metal conductor elements.

The magnetic flux conducting elements, which are preferably in the form of bars or of plates practically compel the whole of the magnetic flux to form a circuit passing from one pole piece to the opposite pole piece on the other side of the rotor, whereas the portion of the magnetic flux which can flow from one pole piece to the adjacent one on the same side of the rotor becomes practically negligible. I therefore obtain, for practically the whole of the magnetic flux, paths such as indicated by the arrows of Fig. 2. Furthermore, the fact that part 6, through which extend the magnetic flux conducting elements, is made of a metal which is a very good conductor of electricity increases the intensity of the Foucault currents created in this disc. All this has for its effect considerably to increase, for a given energizing, the braking torque supplied by the brake.

According to a preferred embodiment, the thickness of part 6, constituted by a disc, or a plurality of discs, is smaller than the length of the magnetic flux conducting elements 5, whereby these elements project from part 6 on both sides thereof. This considerably improves the ventilation of the rotor, that is to say its possibility of evacuating the heat created in the rotor, which evacuation is preferably obtained by means of air streams moving radially along the rotor on either side thereof. This is due to the fact that the ends of the flux conducting elements which project from part disc 6 increase the heat evacuation area and further act as blades to intensify the circulation of cooling air.

In an armature made according to my invention, which includes parts of different materials having different expansion coefficients, it is necessary to avoid perturbing deformations of the armature, at the maximum temperatures it may reach, under the effect of this difference between the expansion coefficients.

This is why, according to another feature of my invention, the magnetic flux conducting elements are divided into a great number of rods 5 or plates 5a (Figs. 1 and 3 to 5) extending in a direction substantially parallel to the axis of disc 6 and supported and secured in holes of this disc, the cross sections of these bars, rods or plates, where they extend through the disc, being sufficiently small to make sure that, at the maximum temperatures of operation of the brake, the differences of expansion remain sufficiently small to avoid any dangerous deformations.

Said magnetic flux conducting elements may have a circular (Fig. 3) square (Fig. 4), polygonal or rectangular (Fig. 5) section. Advantageously, they are disposed to form several concentric circular rows, the distance between the row of maximum diameter and that of minimum diameter corresponding to the radial thickness of the end portions of pole pieces 1. The ends of bars 5 may be made of wider section as at 5b (Fig. 3a) opposite pole pieces 1.

As already mentioned and as shown by the drawings, the magnetic flux conducting elements 5 are of a length nearly equal to the distance between the two sets of pole pieces located on opposite sides of the armature, this length being greater than the thickness of disc 6, whereby the ends of rods or plates 5 or 5a project from the side faces of disc 6. This disc may have a section which decreases toward the periphery (Fig. 1) and may be reinforced at the periphery by a steel wire hooping 7.

Disc 6 is made of a metal which is a very good conductor of heat, such as copper, brass, aluminium, etc. In order to be able to fix the bars or plates 5, 5a in disc 6, when this disc is cast, it is advisable to make use, for making this disc, of a metal having a melting point lower than that of the magnetic metal of which rods or plates 5, 5a are made.

Concerning the flux conducting elements, they may be made of iron or soft steel. If it is desired to keep the maximum temperature of the armature at a relatively low value, so as thus to limit the differences of expansion which may occur during operation of the brake, the magnetic flux conducting elements may be made of a magnetic metal having a Curie point lower than that of iron or soft steel, such a metal consisting for instance of nickel. Owing to the use of nickel for making these elements, the maximum temperature is limited to about 360°, since at this temperature nickel looses its magnetism and the total flux which passes through the armature is then considerably reduced. Other magnetic alloys having a rather low Curie point, in particular below 500° C., can be used instead of nickel.

Concerning the fixation of bars 5 or plates 5a in disc 6, it is obtained, as already stated, preferably when the disc is being cast.

In order to prevent, even when the armature is hot, any displacement of elements 5, 5a with respect to the disc, it is advantageous to provide, on these elements, either ribs 8, or grooves which, after solidification of disc, secure elements 5, 5a in position in this disc.

The rotor diagrammatically shown by Fig. 6 corresponds essentially to the rotor of Figs. 1 and 3. However, in this rotor, piece 5c are not necessarily fixed in disc 6 when this disc is being cast, but may be mounted after obtainment of the disc provided with holes 6a, by engaging bars 5c into holes 6a and subsequently fixing on the ends of bars 5c which project from disc 6 abutments 9 capable of preventing any axial movement of bars 5c with respect to disc 6. It is particularly advantageous to make these abutments 9 in the form of angle pieces of a width greater than that of elements 5c and fixed by one of their branches, acting both as abutment and as cooling fin, in a longitudinal slot of elements 5c, whereas the other branch, which projects from the free end of said elements, forms a cooling fin and chiefly a polar expansion 9a. Weld points 10 serve to keep in position angle member 9—9a in the slot of the corresponding element 6a, which is prevented from rotating in its hole 6a of disc 6 by a key 11 engaged in a longitudinal groove 12 provided in element 5c.

According to another feature of my invention, shown by Figs. 7 and 8, independent expansion of the magnetic flux conducting elements and of the disc or discs in which said elements are fixed is achieved by giving these magnetic flux conducting elements the shape of plates 5d of substantially rectangular section and securing these elements through only one of their edges in substantially radial oblong slots 6b of disc 6, so that the edges of plates 5d opposed to those secured to the disc are free to move outwardly when the plates expand.

In order to secure one edge of each of plates 5d, this edge may be reinforced, for instance by bending it and I provide, at the corresponding end of slot 6b, a wider housing to accommodate this reinforced edge. Furthermore, the slots 6b of disc 6 are open at the periphery of said disc and plates 5d are preferably made of a radial length such that their outer edges project from the periphery of disc 6, whereby these plates form fins not only on the side faces of disc 6 but also on the periphery of said disc.

It should also be noted that the inner walls of slots 6b which, at normal temperature, are in contact with the faces of plates 5d, move away from these faces when the rotor reaches a given temperature for which disc 6, made of copper, brass, etc., undergoes an expansion greater than that of plates 5d. Radial slots are thus opened in disc 6 due to heating thereof, which increases the internal resistance thereof to Foucault currents and reduces the intensity of these currents. I thus obtain a lowering of the maximum temperature of disc 6 in the course of its operation without having recourse, for the construction of plates 5d, to a metal of a particularly low Curie point. It is advantageous to apply, for instance electrolytically, on the faces of plates 5d which, at normal temperatures, are in contact with the material of disc 6, a layer of a metal which is a good conductor of electricity, for instance copper.

Still another feature of the invention to achieve independence of the expansions of the magnetic metal parts of the rotor and of the parts made of a metal which is a good conductor of electricity but is non magnetic is illustrated by Figs. 9 and 10.

Accordingly to this feature, I mount the bars 5 which constitute the magnetic flux conducting elements on a disc 13 located at the center of the rotor and made of the same metal as bars 5, and this disc is directly supported by the brake shaft 4. Furthermore, I dispose on either side of disc 13 other discs 14 of a metal which is a good conductor of electricity but has magnetic qualities lower than the metal serving to constitute elements 5 and 13, these last mentioned discs being also supported by shaft 4. In discs 14 are provided orifices 15 of a section greater than that of bars 5 which extend therethrough so as to project on either side of the set of discs 14. The play of bars 5 in the apertures 15 of discs 14 is sufficiently great to ensure full independence of the expansion of magnetic metal elements 5 and 13 and of non-magnetic metal discs 14.

Advantageously, I provide, in discs 14, near shaft 4, still other apertures 16 enabling the cooling air to flow not only on discs 14 but also on disc 13, which is enclosed between discs 14.

As in the other embodiments of the invention, the magnetic flux closes through bars 5, whereas the Foucault currents are created chiefly in discs 14 through which extend the bars.

Figs. 11 to 13 show still another brake made according to the present invention and in which the problem of independent expansion of the magnetic metal elements and of the elements made of a metal which is a good conductor of electricity but is not magnetic or is feebly magnetic, is solved in a particularly simple manner.

According to this last embodiment, instead of one or several discs through which pass the whole of the magnetic flux conducting elements, I make use of a plurality of closed rings made of a metal which is a good conductor of electricity but is not magnetic or is feebly magnetic, these rings being distributed about the armature axis, each ring surrounding one or several magnetic flux conducting elements and being supported thereby.

The magnetic metal elements, constituted by radial plates 18, which act as magnetic flux conductors are assembled on a hub 17 mounted on shaft 4 and made of the same metal as said elements. Radial plates 18 are fixed on an annular flange 19 of hub 17, the thickness of this flange 19 in axial direction being much smaller than the width of plates 18, which thus project to a substantial distance from flange 19 on either side thereof. Plates 18 may be fixed on hub 17 or they may be cast integral with said flange and hub.

Every plate acting as magnetic flux conductors or every group of several plates, for instance two, three or four plates (two in the example shown), is surrounded by one or several rings 20 of a metal which is a good conductor of electricity but is not magnetic or is feebly magnetic, such as copper, bronze, aluminium, etc. These rings are mounted in such manner on plates 18 that they can expand freely in radial directions.

In order to enable the inner branches of rings 20 to pass between the inner edges of plates 18 and hub 17, I provide, between these edges and this hub, a sufficiently great interval, as shown by Figs. 11 and 12.

Even when every ring 20 surrounds several plates 18, it is necessary to have a plurality of rings distributed about the axis of the armature, so that every ring can expand freely and radially toward the outside, without being hampered in this expansion by rings or portions of rings located on the armature on the opposite side with respect to the axis thereof.

The width of every ring, that is to say the distance between its two radial branches 20a and 20b must be chosen in accordance with the width of the ends of the pole pieces so that these two branches do not cut simultaneously a magnetic flux of given direction. It is therefore the width of the pole pieces which must be taken into account when determining the number of plates 18 that is surrounded by each ring.

When plates 18 are provided, on either side of flange 19, with a plurality of rings juxtaposed and at a distance from one another, as shown by the drawing, it is advantageous slightly to offset the rings of the adjacent groups, so that these groups can engage into one another as shown by Fig. 13.

The operation of the brake shown by Figs. 11 to 13 is quite analogous to that of the brakes above described. When the pole pieces 1 of the inductor are energized by a current, the magnetic flux, or at least most of it, closes through plates 18 made of a magnetic material, playing the part of flux conducting elements, in a direction parallel to the axis of shaft 4. This magnetic flux creates electric currents mostly in rings 20 and these currents, which are analogous to Foucault currents and flow along closed circuits inside rings 20, both exert an intensive braking action upon the armature and heat said rings 20. Of course, the magnetic flux simultaneously creates Foucault currents in plates 18 themselves and in flange 19, these Foucault currents adding their action to that of the currents created in rings 20.

Magnetic metal elements 18, 19 and elements 20, made of a metal which is a good conductor of electricity but little or non magnetic, can expand quite independently under the effect of heat. As a matter of fact, as the expansion coefficient of the metal of rings 20 is higher than that of magnetic elements 18, rings 20 expand more than elements 18. But rings 20 are free to expand in the radial direction, nothing opposes this expansion. At the same time, the centrifugal force keeps their inner portions in firm contact with the inner edges of plates 18.

Of course, this last described embodiment of the invention may be modified in many ways. For instance, I might use, instead of plates 18, magnetic metal bars analogous to the bars 5 of Figs. 9 and 10 and mount on these bars or on every group of bars rings or sleeves of a metal which is a good conductor of electricity.

In a general manner, while I have, in the above descripiton, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electric brake which comprises, in combination, an inductor and an armature movable with respect to each other, said inductor including two groups of pole pieces disposed on either side of said armature respectively, said pole pieces being of alternating polarities so that two adjacent pole pieces on the same side of the armature are of opposed polarities and two pole pieces located opposite each other on opposite sides of said armature respectively are also of opposed polarities, said armature including both at least one part for the formation of currents of the Foucault type therein and a plurality of magnetic flux conducting elements passing through said part and extending between said two groups of pole pieces, the metal of said part being a better conductor of electricity than that of said elements but the metal of said elements being a better conductor of magnetic flux than that of said part, said magnetic flux conducting elements projecting outwardly from said part on at least one side thereof to act as air stirring means for cooling purposes.

2. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including at least one disc of revolution about said axis extending between said two groups of pole pieces, this disc being made of a metal which is a good conductor of electricity but a bad conductor of magnetic flux, for the formation of currents of the Foucault type therein, and a plurality of elongated elements of a magnetic metal at least substantially parallel to said axis fixed in said disc so as to extend between said two groups of pole pieces for conducting magnetic flux between them, the cross sections of said magnetic metal elements where they pass through said disc being sufficiently small to make the difference of expansion between them and the disc practically without danger at the maximum temperature of operation of the brake, said magnetic metal elements projecting outwardly from said disc on either side thereof to act as air stirring means for cooling purposes.

3. An electric brake according to claim 2 in which said disc is provided with a plurality of holes extending in a direction parallel to said axis, said elongated elements being supported and anchored in said holes.

4. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including at least one disc of revolution about said axis extending between said two groups of pole pieces, this disc being made of a metal which is a good conductor of electricity but a bad conductor of magnetic flux, for the formation of currents of the Foucault type therein, said disc being provided with a plurality of at least substantially radial slots, and a plurality of plates of rectangular section of a magnetic metal mounted in said slots respectively so as to extend between said two groups of pole pieces, said plates being fixed to said disc only along one of the edges thereof parallel to said axis whereby they can expand freely in the radial direction with respect to said disc, said plates projecting outwardly from said disc on either side thereof to act as air stirring means for cooling purposes.

5. An electric brake according to claim 4 in which said radial slots open into the outer periphery of said discs and said plates are fixed along their inner edges to said disc, the outer edges of said plates projecting from the periphery of said discs.

6. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including a shaft, a disc of a magnetic metal of revolution about said axis and extending between said two groups of pole pieces, this disc being mounted on said shaft, a plurality of elongated elements of the same metal carried by said disc so as to extend on both sides thereof between said two groups of pole pieces for conducting magnetic flux between them, and a plurality of discs coaxial with the first mentioned one and carried by said shaft, these discs being made of a metal which is a good conductor of electricity but a bad conductor of magnetic flux and being provided with holes for the passage of said elements therethrough with a sufficient play to allow for relative displacements due to differences in expansion, said elongated elements projecting outwardly from said plurality of last mentioned discs on either side thereof to act as air stirring means for cooling purposes.

7. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including a shaft, a piece carried by said shaft, a plurality of magnetic flux conducting elements carried by said piece about said shaft at least substantially in radial planes thereof and extending between said two groups of pole pieces for conducting magnetic flux between them, and a plurality of rings of a metal which is a good conductor of electricity but a bad conductor of magnetic flux, each of said rings surrounding at least one of said magnetic elements so as to be applied against one peripheral portion thereof but to be free to expand radially with respect thereto.

8. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including a shaft, a piece carried by said shaft, a plurality of magnetic flux conducting plates carried by said piece about said shaft at least substantially in radial planes thereof and extending between said two groups of pole pieces for conducting magnetic flux between them, and a plurality of rings of a metal which is a good conductor of electricity but a bad conductor of magnetic flux, each of said rings surrounding at least two of said magnetic plates so that said rings are applied against the inner portions of said plates but are free to expand radially in the outward direction, one of the at least two plates surrounded by one ring being also surrounded by an adjacent ring offset laterally with respect to said last mentioned one.

9. An electric brake according to claim 4 in which said disc is made of a metal which expands more under the effect of an increase of temperature than the metal of said plates whereby said slots are no longer filled by said plates when said temperature exceeds a given value, and the internal resistance of the armature to Foucault currents is increased.

10. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including a shaft, a piece carried by said shaft, a plurality of magnetic flux conducting plates carried by said piece about said shaft at least substantially in radial planes thereof and extending between said two groups of pole pieces for conducting magnetic flux between them, and a plurality of rings of a metal which is a good conductor of electricity but a bad conductor of magnetic flux, each of said rings surrounding at least two of said magnetic plates so as to be applied against the inner portions of said plates but to be free to expand radially in the axial direction, the dimensions of said rings in the axial direction being smaller than the dimensions of said plates, whereby said plates are capable of acting as air stirring blades for cooling purposes.

11. An electric brake which comprises, in combination, an inductor and an armature rotatable with respect to each other, said inductor including two groups of pole pieces disposed opposite each other on either side of a plane at right angles to the axis about which said inductor and armature rotate with respect to each other, said armature including a shaft, a piece carried by said shaft, a plurality of magnetic flux conducting plates carried by said piece about said shaft at least substantially in radial planes thereof and extending between said two groups of pole pieces for conducting magnetic flux between them, and a plurality of rings of a metal which is a good conductor of electricity but a bad conductor of magnetic flux, each of said rings surrounding at least two of said magnetic plates so that said rings are applied against the inner portions of said plates but are free to expand radially in the axial direction, one of the at least two plates surrounded by one ring being also surrounded by an adjacent ring offset laterally with respect to said last mentioned one and located at a distance therefrom.

PIERRE ETIENNE BESSIERE.

REFERENCES CITED

The following references are of record in the file of this patent:

UNITED STATES PATENTS

| Number | Name | Date |
|---|---|---|
| 439,577 | Dewey | Oct. 28, 1890 |
| 653,424 | Lunt | July 10, 1900 |
| 1,748,753 | Bowie | Feb. 25, 1930 |
| 1,847,006 | Kalisher | Feb. 23, 1932 |
| 2,361,239 | Ransom | Oct. 24, 1944 |
| 2,373,262 | Rogowski | Apr. 10, 1945 |

FOREIGN PATENTS

| Number | Country | Date |
|---|---|---|
| 693,975 | Germany | July 23, 1940 |